H. C. BUHOUP.
BRAKE MECHANISM.
APPLICATION FILED MAR. 17, 1913.
1,081,428.
Patented Dec. 16, 1913.
3 SHEETS—SHEET 1.
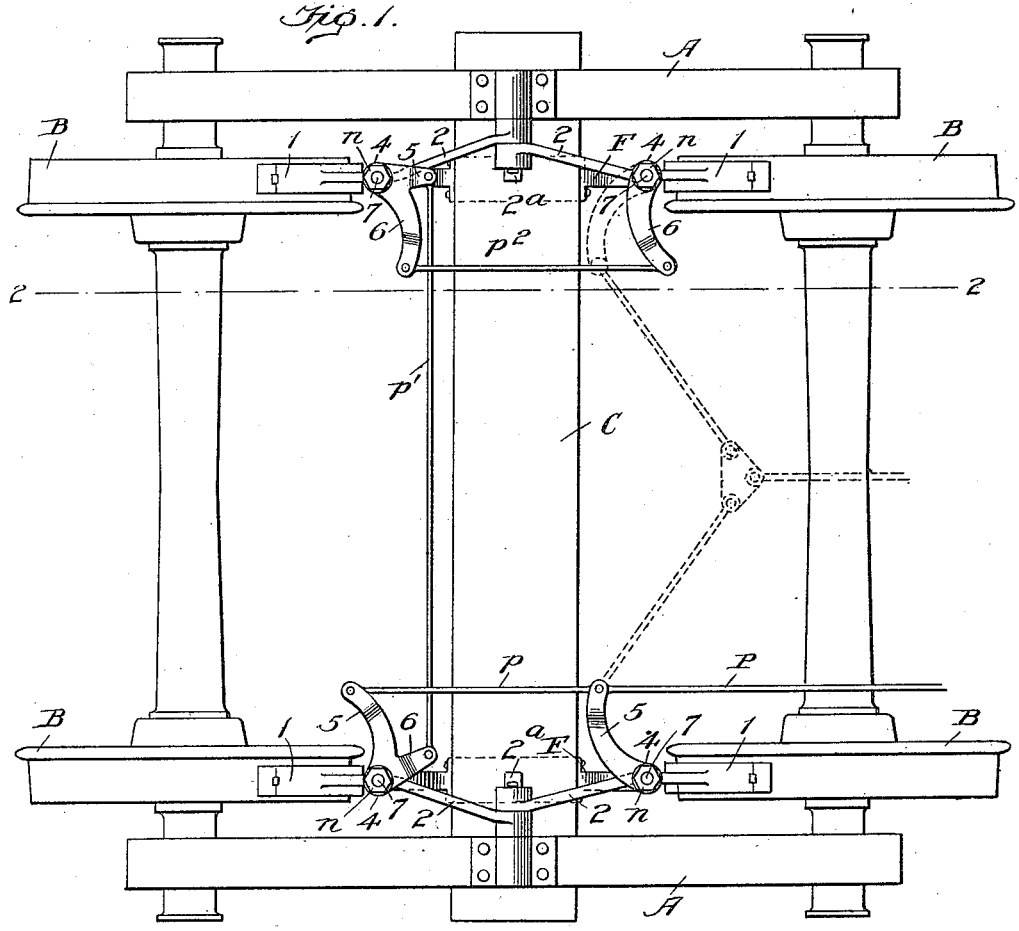
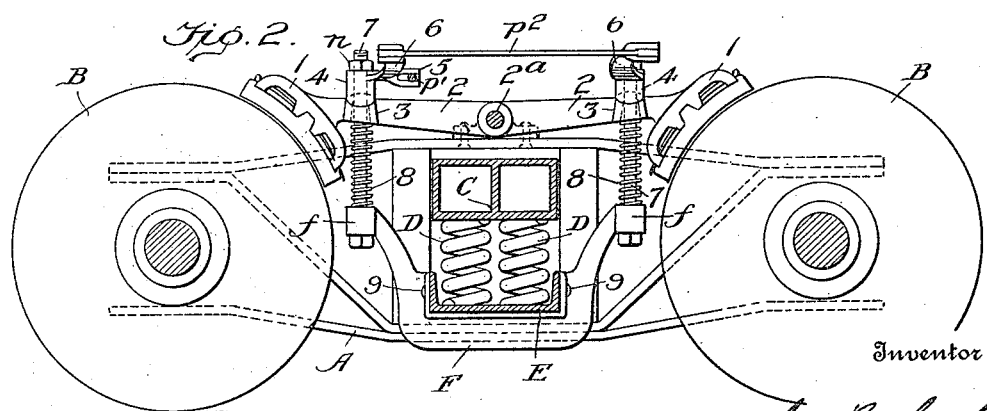

H. C. BUHOUP.
BRAKE MECHANISM.
APPLICATION FILED MAR. 17, 1913.
1,081,428.
Patented Dec. 16, 1913.
3 SHEETS—SHEET 2.
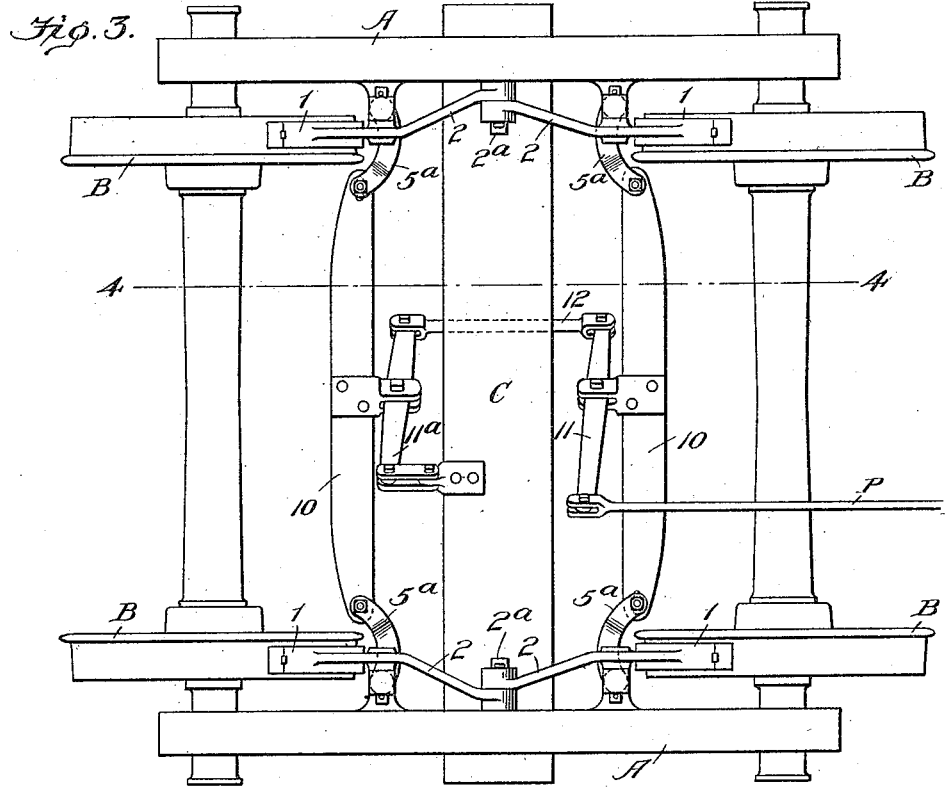
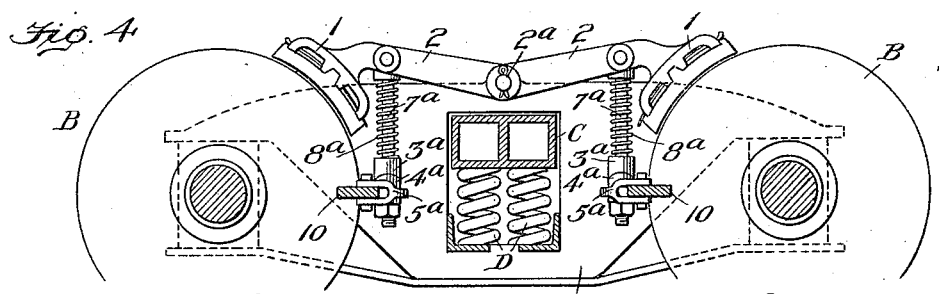
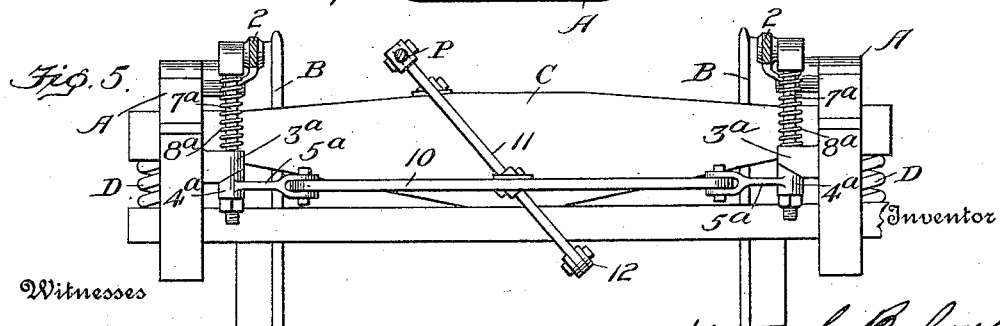

H. C. BUHOUP.
BRAKE MECHANISM.
APPLICATION FILED MAR. 17, 1913.
1,081,428.
Patented Dec. 16, 1913.
3 SHEETS—SHEET 3.
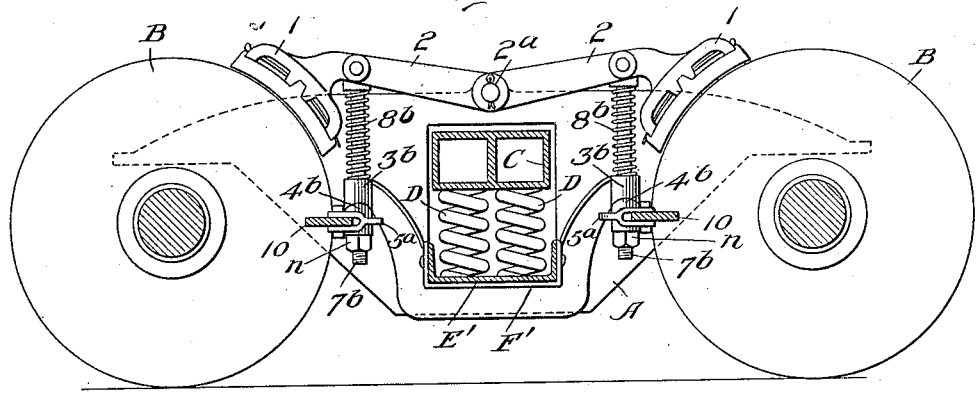
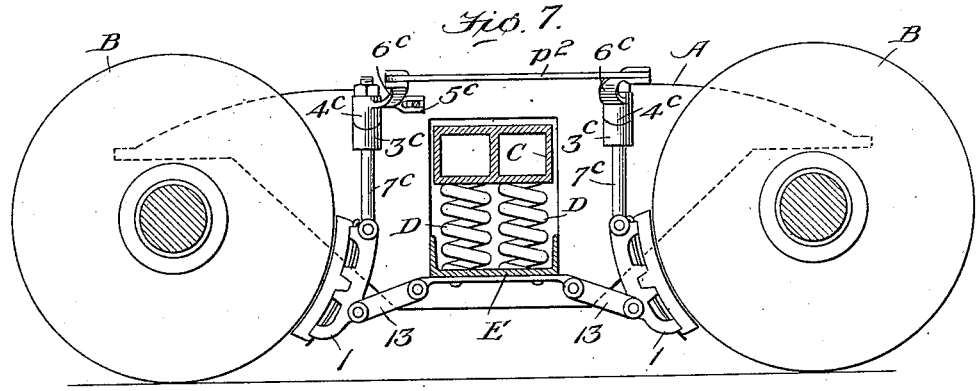
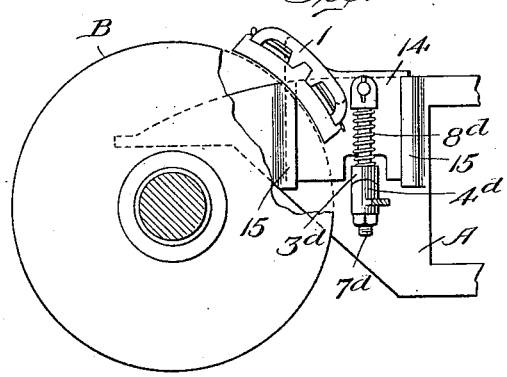
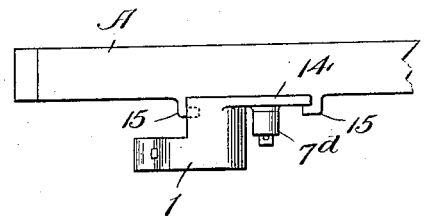

UNITED STATES PATENT OFFICE.

HARRY C. BUHOUP, OF CHICAGO, ILLINOIS.

BRAKE MECHANISM.

1,081,428. Specification of Letters Patent. Patented Dec. 16, 1913.

Application filed March 17, 1913. Serial No. 754,782.

*To all whom it may concern:*

Be it known that I, HARRY C. BUHOUP, a citizen of the United States, residing at Chicago, in the county of Cook and State of Illinois, have invented certain new and useful Improvements in Brake Mechanisms; and I do hereby declare the following to be a full, clear, and exact description of the invention, such as will enable others skilled in the art to which it appertains to make and use the same.

My invention relates to the construction of brake mechanism for car trucks, and especially to that class of brake mechanism wherein the weight of the car determines and controls the braking power exerted on the wheels of the car truck.

The commonly adopted construction of brake mechanism for car trucks is one in which the power is applied directly to the brake-shoes through the intermediation of the brake beams which carry the brake heads, and levers with which the pull rod of the air brake mechanism is connected. As a result of this direct and uncontrolled application of the power to the brake shoes, the same, or equal, power is applied to the brake shoes on the trucks of both heavy and light or loaded and empty cars, and thus the braking power, which is approximately twenty thousand pounds per shoe for braking the wheels under a loaded or heavy car, is excessive for braking the wheels under a lightly loaded or empty car, which requires only approximately six thousand pounds per shoe. Consequently the wheels under the lighter car will slide on the rails when subjected to braking power sufficient for control of the heavier car. The sliding of the car wheels results in the production of flat spots on the tread of the wheel limiting the mileage or life of the wheel, requiring the more or less frequent removal and replacement of wheels, and greatly adding to the cost of maintenance of the rolling stock of a road. Further than this, where the wheels are caused to slide there is a great loss of braking power. Also the commonly adopted construction of brake mechanism results in the locating of the brake-shoes between the wheels, and frequently below the centers thereof, so that the braking power when applied tends to raise the wheels, thereby reducing the friction between the wheels and rails, which results in a proportionate loss of braking power.

A further disadvantage of the present construction of brake mechanism for car trucks, resides in the inability to readily and conveniently adjust, or remove and replace, worn brake shoes to compensate not only for wear of the shoes, but also for unequal wear of the shoes. Where there is lost motion from brake shoe wear the excessive travel of the air-brake piston results in loss of braking power, and where the shoes are unequally worn, the application of the braking power tends to cause twisting or torsional strain on the brake-beams which carry the brake-shoes.

The object of my present invention, therefore, is the production of a simple and efficient brake mechanism, and one readily applicable to the present car truck construction, whereby the brake shoes, regardless of unequal wear, shall exert uniform braking force upon the wheels, and whereby the braking force shall be determined and controlled by the weight of the car, and the sliding of the wheels and the flattening thereof be prevented; and whereby, also, wear of the brake shoes may be readily compensated for by adjustment of the brake heads, and as a result thereof the braking power may be conserved.

To this end the main feature of my invention embraces the combination in a brake mechanism for car trucks, of a brake shoe movably connected with the truck, and mating cam devices for applying the brake shoes to the wheels when power is applied, one of which mating cam devices is connected with the mechanism which transmits the braking power and the other of which mating cam devices co-acts with the car-bolster through the mediation of a yielding means, whereby the load on the car determines and controls the braking pressure applied by the brake-shoes to the wheels.

There are other, minor, features of invention involving particular combinations and elemental features of construction, ancillary to the main features of invention, all of which will hereinafter more fully appear.

In the drawings chosen for the purpose of illustrating my invention, the scope whereof is pointed out in the claims, Figure 1 is a plan view of a car truck showing the brake mechanism embodying my invention, illustrating the preferred form thereof. Fig. 2 is a vertical section of the truck and brake mechanism embodying my invention, taken in the plane of the line 2—2 Fig. 1. Fig. 3 is a plan view of a car truck and brake mechanism embodying my invention in a modified form, wherein brake levers and brake beams of substantially the construction now in use are utilized. Fig. 4 is a vertical section of a car truck and brake mechanism embodying my invention in the modified form, taken in the plane of the line 4—4 Fig. 3. Fig. 5 is an end view of the car truck and brake mechanism shown in Fig. 3, the near axle and wheels being removed and the near brake heads broken away. Fig. 6 is a vertical sectional view of a car truck and brake mechanism embodying a further modification in the arrangement of the brake mechanism. Fig. 7 is a vertical sectional view of a car truck and modification of brake mechanism embodying my invention, showing an arrangement thereof especially adapted for use where it is desired to apply the brake shoes between and below the wheel centers. Fig. 8 is a detail view of a portion of the side frame of a car truck and a brake shoe support slidably mounted thereon. Fig. 9 is a top or plan view of the portion of car truck and brake shoe slide shown in Fig. 8, the brake shoe being omitted.

Like symbols refer to like parts wherever they occur.

I will now proceed to describe my invention more fully so that others skilled in the art to which it appertains may apply the same.

In the drawings, A, A indicate the side frames of a car truck, B, B the wheels of the truck, C the bolster, D the bolster springs, E the spring plank, and F the spring plank saddle, all of which may be of the construction shown, or any approved construction.

1, 1 indicate the brake shoes and brake heads, which are movably connected with the side frame in any suitable manner, so as to be independent of each other.

In the preferred form of construction the connections between each brake shoe and the car truck is in the form of an arm or lever 2 pivoted on the side frame as at 2ᵃ and the brake shoe 1 is located above the center of the wheel so that when the braking power is applied the tendency is to press the wheel downward.

Upon the upper surface of the brake shoe arm or lever 2 is one member 3 of mating cam devices 3, 4, through which the braking power of the air brake mechanism is applied to the brake shoe. These mating cam devices 3, 4 are preferably of tubular form for the passage of a bolt or rod and are provided with helical bearing faces whereby the relative rotation of such mating cam devices causes a relative linear movement of the members.

The rotary member 4 of the mating cam devices, in the preferred construction, Figs. 1 and 2 of the drawings, is located over and rests upon the non-rotary or fixed cam member 3 on the brake shoe arm 2, and this rotary member 4 is provided with crank arms whereby it may be rotated and through which it may be connected with and rotate like members which coact with other brake shoes.

In Figs. 1 and 2 of the drawings the preferred form of applying the braking power to the cam devices is shown in full lines, wherein P indicates the pull rod which is connected with the crank arm 5 of the first rotary cam member 4 and this crank arm is in turn connected by a rod or link $p$ with the next crank arm 5, which in turn is connected through crank arm 6 and rod or link $p'$ with the third crank arm 5 and this latter is in turn connected with the last cam device 4 by means of crank arms 6 and connecting rod $p^2$. If a central position of the pull rod P is required, or desired, the connecting rod $p'$ may be omitted and connections made as indicated by dotted lines Fig. 1.

The coöperative relations of the members 3 and 4 of the mating cam devices is maintained by the bolt 7 which passes through them. This bolt 7 has a point of attachment or support either on the side frame of the car truck or some element of the construction carried thereby that will cause the bolster springs and load on the bolster to resist the movement of said bolt 7.

In the preferred form of the construction illustrated in Figs. 1 and 2 of the drawings the bolt 7 passes through an eye $f$ on the horn of saddle F which carries the spring plank E and bolster springs D. The bolt 7 is encircled by a spiral release spring 8 one end of which rests on the horn of the saddle F and the other bears against the under side of the brake shoe arm or brake shoe lever 2. The bolt 7 is threaded at its upper end and provided with a nut $n$ for maintaining and adjusting the connection between the saddle, bolt, release spring, lever or brake shoe arm, and mating cam devices. The function of the spring 8 is to hold the brake shoe away from the wheel when the braking power is off, and the distance of the brake shoe from the wheel will depend on the operative length of the bolt 7 so that by means of the nut $n$ the brake shoe can be adjusted to take up wear and determine the distance the brake shoe must move when the brakes are applied. The saddle F is riveted, or otherwise connected, to and supported from the spring-plank E, as indicated at 9.

In Figs. 3, 4 and 5 of the drawings, a modification of the arrangement of the mating cam devices is shown, as well as a modification in the means for applying the braking power to the mating cam devices. In this modification, the saddle on which the spring plank rests is omitted; the fixed or non-rotary cam member $3^a$ of the mating cam devices is formed integral with or connected directly to the side frame A of the car truck, the crank arm $5^a$ of the rotary member $4^a$ of the mating cam devices is connected to one of the beams 10, 10, which beams are provided with the usual brake levers 11, $11^a$ and connecting rod 12, and the lever 11 is connected with the pull rod P of the air brake mechanism. In this arrangement the release spring $8^a$ which encircles the bolt $7^a$ is interposed between the fixed member $3^a$ of the cam devices and the brake shoe arm or lever 2.

In the modification shown in Fig. 6 of the drawings, the saddle F′ is attached to the spring plank E′, the fixed non-rotary cam member $3^b$ of the mating cam devices is formed on the horn of the saddle, and the release spring $8^b$ is interposed between the horn of the saddle F′ and the brake shoe arm or brake shoe lever 2. In this construction the rotary member $4^b$ of the mating cam devices is located below the member $3^b$ and below the horn of saddle F′ and is confined by the nut $n$.

In the modification shown in Fig. 7, which is adapted for those constructions where the brake shoe is to be applied between the wheels and below the centers thereof, the brake shoes are movably connected with the spring plank by short links 13 and suspended from bolt $7^c$ which passes through the annular mating cam devices $3^c$ and $4^c$. The fixed or non-rotary cam member $3^c$ is formed on or attached to the side frame A of the truck, while the rotary cam member $4^c$ is supported by and confined to the cam device member $3^c$ by a suitable nut. The crank arms $5^c$ and $6^c$ of the rotary cam members $4^c$ are operatively connected with each other and with the pull rod as illustrated in Fig. 1 of the drawings.

In Figs. 8 and 9 of the drawing there is shown a modified form of the movable connection between the brake shoe and the side frame of the car truck which may be adopted instead of using the pivoted arm 2, Figs. 2 and 4, if desired. In this construction the brake head and brake shoe are mounted directly on a slide 14 movable in ways 15 on the side frame A of the car truck. With this slide 14 the bolt $7^d$, which passes through the mating cam devices $3^d$ and $4^d$, is connected, and a spiral release spring $8^d$ is interposed between the head of the bolt which is connected with the slide and the fixed or non-rotary cam member $3^d$ of the mating cam devices. The fixed or non-rotary cam members $3^d$ of the mating cam devices is secured to the side-frame A of the car truck, and the rotary member $4^d$ of the cam devices is located below the member $3^d$ and confined by a nut in the usual manner.

The brake mechanism being constructed and combined as hereinbefore pointed out will operate as follows: In the construction illustrated in Figs. 1 and 2 the braking power applied to the pull rod P will be transmitted through the intermediate devices to the several rotary members 4 of the mating cam devices, these cam members 4 being thus rotated on their respective bolts 7 and on their corresponding mating cam members 3. The initial rotation of the cams 4 causes the brake-shoe levers 2 to be depressed, thus compressing the release springs 8 and bringing the brake-shoes 1 into contact with their respective wheels B. When the brake-shoes have thus come into contact with the wheels of the truck, the further rotation of the cams 4 imparts an upward, lifting force to the bolts 7 and a downward, braking pressure of the brake-shoes upon the wheels. As the bolts 7 are connected to the spring-plank saddle F in such manner as to be capable of exerting upward force upon the saddle, the upwardly directed force applied to the bolts 7 by the rotary cams 4 is transmitted to the bolster C and its superposed car body through the bolster springs D thus lifting or tending to lift, according as the load is light or heavy, the car body and its load, and thereby permitting the power applied by the rotary cams 4 in excess of that necessary to overcome the weight of the car to be expended in the work of lifting the car. Where my brake mechanism is applied to a form of truck in which the spring-plank is relatively movable vertically with respect to the side-frames any upward pull of the bolts 7 upon the spring-plank saddle F in excess of that necessary to counterbalance the weight of the parts supported on the spring-plank will cause the latter to move upwardly with respect to the side frames. Where my brake mechanism is applied to a type of truck in which the spring-plank and side-frames are rigidly connected any force applied to the bolts 7 sufficient to overcome the load carried on the bolster and side frames will lift the latter and thus cause a corresponding elevation of the car body and its load. By this means the braking force of the brake-shoes 1 on the wheels B is rendered proportional to the load carried by the truck bolster C.

The form of construction illustrated in Figs. 3, 4 and 5 of the drawings operates in substantially the same manner as that just described, any tendency to an excessive pull upon the bolts $7^a$ being relieved by the lifting of the side-frames and a corresponding elevation of the bolster and its superposed load. The construction shown in Fig. 6 also operates in substantially the same manner as the mechanism illustrated in Figs. 1 and 2, the only substantial differences being that the rotary cams 4ᵇ operate directly upon the spring-plank saddle F' and cause a downward, instead of an upward, pull upon the bolts connected to the brake-shoe levers 2.

In the modified form of construction illustrated in Fig. 7 of the drawings, the toggle action of the links 13, acting upon the spring-plank E, causes any excessive braking power applied by the rotary cams 4ᶜ to be expended in lifting the load imposed upon the bolster C. The construction illustrated in Figs. 8 and 9 operates in substantially the same manner as the brake mechanism shown in Figs. 3, 4 and 5, slides 14 which bear the brake-shoes 1 being mounted upon the side-frames A of the truck and serving to perform the functions of the brake-shoe levers 2.

Having thus described my invention, what I claim and desire to secure by Letters Patent, is:

1. In a brake mechanism for car trucks, the combination with a truck side frame and bolster, of a brake shoe movably connected with the side frame of the car truck, mating cam devices for transmitting braking power to the brake shoe, and yielding means operatively interposed between the bolster and the cam devices for limiting the pressure of the cam devices on each other.

2. In a brake mechanism for car trucks, the combination with a car truck side frame, a bolster, and bolster springs, of a brake shoe movably connected with the side frame, mating cam devices for actuating the brake shoe, and means interposed between one of the cam devices and the bolster, whereby the load on said bolster may be transmitted to said cam device.

3. In a brake mechanism for car trucks, the combination with a car truck side frame, a bolster, and bolster springs, of a brake shoe movably connected with the side frame, mating cam devices for actuating the brake shoe, and means interposed between one of the members of the cam device and the bolster, whereby the load on said bolster may be transmitted to the cam devices.

4. In a brake mechanism for car trucks, the combination with a side frame and bolster, of a brake shoe, a brake shoe lever pivoted on the side frame, mating cam devices for actuating the brake shoe lever, and means operatively interposed between the bolster and the mating cam devices, for transmitting the load on the bolster to the cam devices.

5. In a brake mechanism for car trucks, the combination with a side frame, a bolster and bolster springs, of a brake shoe lever pivoted on the side frame, mating cam devices for actuating the brake shoe, one of said cam devices being located on the brake shoe lever, and means interposed between one of the cam devices and the bolster whereby the load on said bolster may be transmitted to the cam devices.

6. In a brake mechanism for car trucks, the combination with a car truck side frame, a bolster, and bolster springs, of a brake shoe, a brake shoe lever pivoted on the side frame, mating cam devices for actuating the brake shoe lever, a saddle interposed between the bolster springs and mating cam devices, and means for connecting the saddle with the mating cam devices, whereby the load on the bolster may be transmitted to the cam device.

7. In a brake mechanism for car trucks, the combination with a car truck side frame, a bolster, and bolster springs, of a brake shoe movably connected with the side frame, mating cam devices for actuating the brake shoe, means interposed between said cam devices and the bolster whereby the load on said bolster may be transmitted to said cam device, and a spring for moving the brake shoe from braking position whereby the brake shoe is held out of engagement with the car wheel when released by the cam devices.

8. In a brake mechanism for car trucks, the combination with a car truck side frame, of a brake shoe movably connected therewith, mating cam devices for actuating the brake shoe, a release spring for the brake shoe, and a bolt for connecting the release spring and the mating cam devices with each other and with the movable brake shoe.

9. In a brake mechanism, the combination of a car truck side frame, spring plank, springs, independent brake shoe lever arms having a vertical movement, and means independent of the movement of the car body for inducing a downward movement of said lever arms when braking power is applied and for inducing an upward pressure on said springs.

In testimony whereof I affix my signature, in the presence of two subscribing witnesses.

HARRY C. BUHOUP.

Witnesses:
D. B. MASON,
HARRY W. STANNARD.